US012641339B2

(12) United States Patent
Saito

(10) Patent No.: US 12,641,339 B2
(45) Date of Patent: May 26, 2026

(54) IMAGE CAPTURING APPARATUS HAVING IMAGE SENSOR ROTATABLE IN PLANE INTERSECTING OPTICAL AXIS AND METHOD CONTROLLING THE SAME

(71) Applicant: CANON KABUSHIKI KAISHA, Tokyo (JP)

(72) Inventor: Junichi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 18/630,852

(22) Filed: Apr. 9, 2024

(65) Prior Publication Data

US 2024/0348924 A1 Oct. 17, 2024

(30) Foreign Application Priority Data

Apr. 13, 2023 (JP) ................................ 2023-065733

(51) Int. Cl.
*H04N 23/68* (2023.01)

(52) U.S. Cl.
CPC ......... *H04N 23/687* (2023.01); *H04N 23/689* (2023.01)

(58) Field of Classification Search
CPC ..... H04N 23/687; H04N 23/73; H04N 23/689
See application file for complete search history.

(56) References Cited

U.S. PATENT DOCUMENTS

2021/0337122 A1* 10/2021 Shibata .................. H04N 23/73
2022/0417437 A1* 12/2022 Kimura ............. H04N 23/6812

FOREIGN PATENT DOCUMENTS

JP 2007193155 A 8/2007
JP 2021113859 A * 8/2021

* cited by examiner

*Primary Examiner* — Lin Ye
*Assistant Examiner* — Steven Daniel Barry
(74) *Attorney, Agent, or Firm* — Canon U.S.A., Inc. IP Division

(57) ABSTRACT

An image capturing apparatus includes an image sensor, a determination unit, and a control unit. The image sensor is rotatable in a plane intersecting an optical axis, and accumulates electric charges at a different timing for each area. The determination unit is configured to determine an exposure time of the image sensor. The control unit is configured to select and execute one of first control to start exposure of the image sensor in response to movement of a first light shielding member and terminate the exposure in response to movement of a second light shielding member and second control to start exposure of the image sensor and terminate the exposure in response to movement of the second light shielding member. The control unit selects one of the first control and the second control based on information about the rotation of the image sensor and the determined exposure time.

2 Claims, 4 Drawing Sheets

IMAGE CAPTURING APPARATUS HAVING IMAGE SENSOR ROTATABLE IN PLANE INTERSECTING OPTICAL AXIS AND METHOD CONTROLLING THE SAME

BACKGROUND

Technical Field

One disclosed aspect of the embodiments relates to image capturing apparatuses and in particular to an image capturing apparatus rotatably holding an image sensor.

Description of the Related Art

To correct vibrations, so-called hand shake, applied to a lens-interchangeable digital camera or the like, there is a known technique in the relate art for driving an image sensor in a plane perpendicular to the optical axis. There is another technique for horizonal correction for making the lateral direction of the picture composition horizontal by rotating the image sensor in a plane perpendicular to the optical axis.

Some lens-interchangeable digital cameras include a shutter (a light shielding member), referred to as a focal-plane shutter, that moves mechanically to adjust the exposure time. The focal-plane shutter includes two kinds of shutter, referred to as a front curtain and a rear curtain, each moving in the vicinity of the subject side of the image sensor. Since a light beam starts to enter the image sensor as the front curtain moves, and the light beam to the image sensor is blocked as the rear curtain moves, the duration (exposure time) of the light beam incident on the image sensor is determined by adjusting the interval between the front curtain and the rear curtain. Examples of the shutter of the lens-interchangeable digital camera include an electronic shutter that uses electric-charge accumulation control of the image sensor and a combination of the electronic shutter and a mechanical shutter such as the above-described focal-plane shutter.

Image capturing apparatuses equipped with the above technique and movably holding an image sensor have a risk of image blur due to vibrations of the image sensor during exposure caused by strong vibrations associated with the movement of the focal-plane shutter. The frequency of the vibrations associated with the movement of the focal-plane shutter is often in the order of 100 Hz. For this reason, if the exposure time is significantly shorter than the period of the vibration, image blur is less likely to occur, whereas if the exposure time is longer than the period of the vibration, image blur is more likely to occur.

Accordingly, Japanese Patent Laid-Open No. 2007-193155 proposes a technique for switching the front curtain from the focal-plane shutter to the electronic shutter when the exposure time exceeds a predetermined time.

With the configuration in which the image capturing apparatus that holds the image sensor movably includes the focal-plane shutter, the shutter unit including the focal-plane shutter is typically fixed in position and does not move with the image sensor. For this reason, using the electronic shutter as the front curtain and the focal-plane shutter as the rear curtain causes, when the image sensor is rotating within a plane perpendicular to the optical axis, an angular difference corresponding to the rotation between the moving direction of the front curtain and the moving direction of the rear curtain, which may result in exposure unevenness in the lateral direction of the image. This exposure unevenness becomes more pronounced as the exposure time decreases or the rotation angle of the image sensor increases.

Accordingly, Japanese Patent Laid-Open No. 2021-113859 proposes a technique for returning the tilt of the image sensor to less than or equal to a predetermined tilt (returning the rotation angle to a predetermined angle or less) immediately before exposure.

However, both of Japanese Patent Laid-Open No. 2007-193155 and Japanese Patent Laid-Open No. 2021-113859 do not disclose a method for solving the image blur caused by the movement of the light shielding member and the exposure unevenness caused by the rotation of the image sensor.

SUMMARY

One embodiment of the disclosure is an image capturing apparatus that includes an image sensor, a light shielding unit, a determination unit, and a control unit. The image sensor is held so as to be rotatable in a plane intersecting an optical axis. The image sensor is configured to accumulate electric charges at a different timing for each area. The light shielding unit includes a first light shielding member and a second light shielding member that block a light beam toward the image sensor. The determination unit is configured to determine an exposure time of the image sensor. The control unit is configured to select and execute one of a first control and a second control. The first control starts exposure of the image sensor in response to movement of the first light shielding member and terminates the exposure of the image sensor in response to movement of the second light shielding member. The second control starts exposure of the image sensor and terminates the exposure of the image sensor in response to movement of the second light shielding member. The control unit selects one of the first control and the second control based on information about the rotation of the image sensor and the determined exposure time.

Further features of the disclosure will become apparent from the following description of exemplary embodiments with reference to the attached drawings.

DESCRIPTION OF THE EMBODIMENTS

Figure 1A:
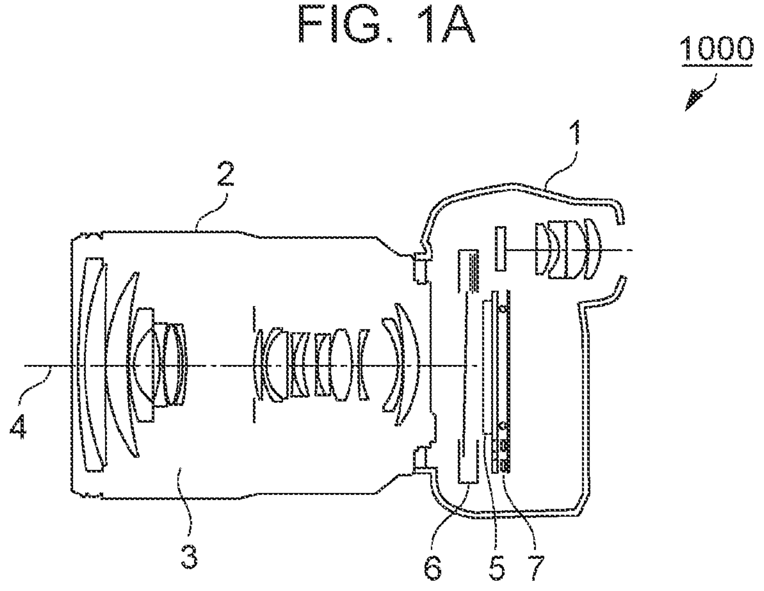
FIG. 1A is a schematic cross-sectional view of an image capturing apparatus.
Figure 1B:
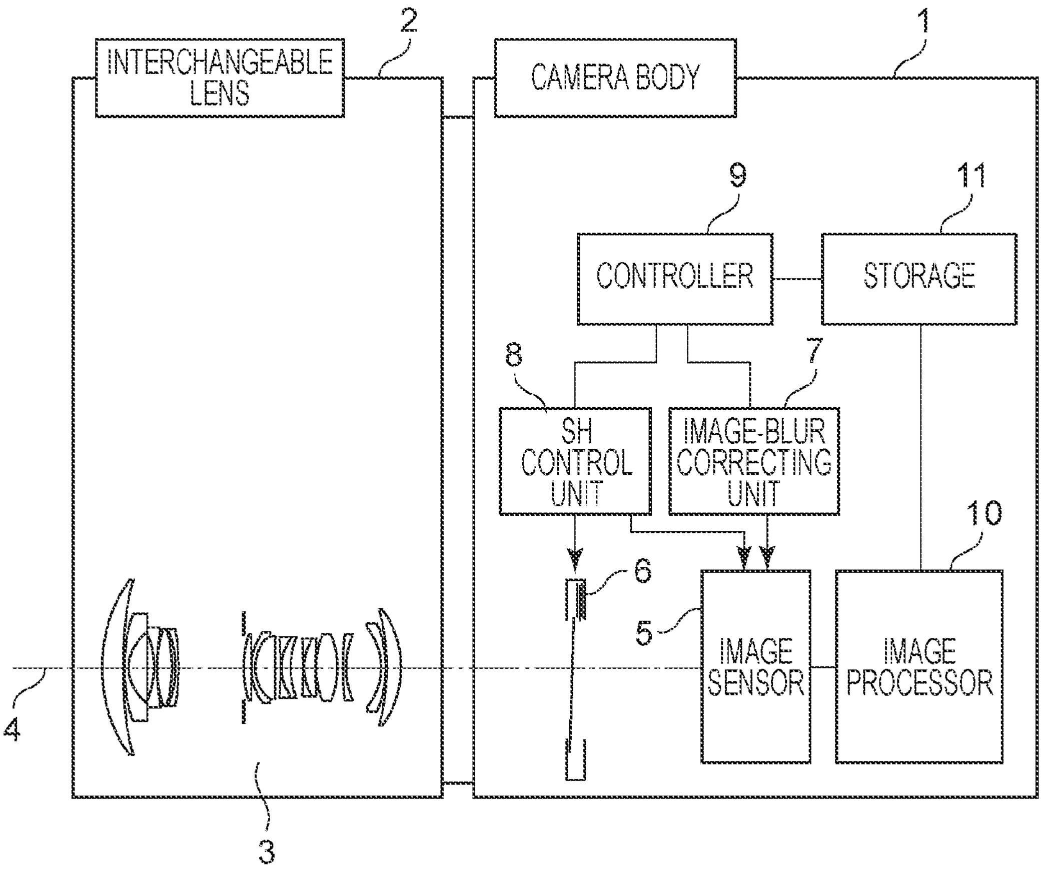
FIG. 1B is a schematic block diagram of the image capturing apparatus.

An image capturing apparatus 1000 and the operation thereof according to an embodiment will be described with reference to the drawings. FIGS. 1A and 1B are schematic diagrams of the image capturing apparatus 1000. FIG. 1A is a schematic cross-sectional view of the image capturing apparatus 1000 illustrating the distinctive configuration of an embodiment. FIG. 1B is a schematic block diagram of the image capturing apparatus 1000 illustrating the distinctive configuration of an embodiment.

The image capturing apparatus 1000 is a what-is-called lens-interchangeable single-lens reflex camera and includes a camera body 1 and an interchangeable lens 2 connected via a camera mount. The image capturing apparatus 1000 may be a lens-integrated camera. The interchangeable lens 2 includes an imaging optical system 3 including one or more lenses and an aperture, through which an incident light beam passes to form an image on an image sensor 5 disposed in the camera body 1. The image sensor 5 is an image sensor that accumulates electric charges at a different timing for each region (for example, every row), such as a complementary metal-oxide semiconductor (CMOS) sensor, in which the light beam is photoelectrically converted into image signals. The image signals read from the image sensor 5 in sequence for each row are guided to an image processor 10 and stored in the memory of a storage 11 as an image file through various developing processes. The image sensor 5 is held so as to be movable relative to a fixed member in directions intersecting an optical axis 4. The movement of the image sensor 5 in the directions intersecting the optical axis 4 include translation and rotation (hereinafter referred to as a rolling operation) in a plane of the image sensor 5 intersecting the optical axis 4. The holding structure for the image sensor 5 may be any known holding structure, for example, the structure disclosed in Japanese Patent Laid-Open No. 2021-113859.

The image capturing apparatus 1000 includes an image-blur correcting unit 7 so as to reduce image blur due to vibrations, such as hand shake, applied to the image capturing apparatus 1000. The image-blur correcting unit 7 includes a motor serving as a driving unit for moving the image sensor 5 in directions intersecting the optical axis 4. Any known motor driving method may be used, for example, a method using a magnet and a coil and a method using ultrasonic vibrations. The image-blur correcting unit 7 includes a gyroscope for use in detecting the motion of the image capturing apparatus 1000 in the yaw, pitch, and roll directions. The gyroscope may include three gyroscopes for detecting motions in the yaw, pitch, and roll directions, respectively, or a single gyroscope unit for detecting motions in the yaw, pitch, and roll directions.

The image capturing apparatus 1000 further includes a controller 9 for controlling the image-blur correcting unit 7.

The controller 9 performs drive control for moving a movable unit that holds the image sensor 5 in directions intersecting the optical axis 4 so as to cancel the vibrations, such as hand shake. In this case, the image sensor 5 can also be translated in directions intersecting the optical axis 4 but also be rolled. Using the rolling operation allows for reducing image blur due to the roll component of hand shake (a rotational component about the optical axis 4) applied to the image capturing apparatus 1000. Using the rolling operation also allows for collecting the inclination of the image sensor 5 relative to the horizontal direction so as to horizontally orient the lateral direction of the picture composition when the photographer sets up the image capturing apparatus 1000. Of the rolling operations, an operation for horizontally orienting the lateral direction of the picture composition is referred to as a horizontal correcting operation (a first rotating operation) and an operation for reducing image blur due to the roll component of hand shake is referred to as a roll-blur correcting operation (a second rotating operation). The controller 9 includes at least one processor, such as a central processing unit (CPU), and controls the components of the image capturing apparatus 1000.

A focal-plane shutter 6 includes a light shielding member that moves to allow a blocked light beam directed to the image sensor 5 to enter the image sensor 5 and a light shielding member that moves to block the light beam incident on the image sensor 5. The former light shielding member (a first light shielding member) is generally referred to as a front-curtain shutter, and the latter light shielding member (a second light shielding member) is generally referred to as a rear-curtain shutter. The front-curtain shutter and the rear-curtain shutter are also simply referred to as a front curtain and a rear curtain, respectively. Using the front curtain of the focal-plane shutter 6 at the start of exposure is referred to as using a mechanical front curtain, and using the rear curtain of the focal-plane shutter 6 at the end of exposure is referred to as using a mechanical rear curtain. In this embodiment, the shutter unit including the focal-plane shutter is fixed in position and does not move with the image sensor 5.

In still image capturing, the start of exposure and the end of exposure can be set by moving the front curtain and the rear curtain of the focal-plane shutter 6, respectively. Such control for starting the exposure of the image sensor 5 in response to the movement of the front curtain of the focal-plane shutter 6 and terminating the exposure of the image sensor 5 in response to the movement of the rear curtain of the focal-plane shutter 6 is referred to as mechanical front curtain driving (first control). Such mechanical front curtain and mechanical rear curtain driving control is performed using a shutter control unit 8.

The image sensor 5 is configured to start photoelectrical conversion of pixels arranged in two dimensions in sequence in the column direction (in the vertical direction at a normal camera set-up position) for each row and to determine the start of exposure by shifting the row to start photoelectrical conversion at high speed, as with the above-described mechanical front curtain. Such an operation is referred to as a front curtain operation using an electronic shutter, that is, an electronic front curtain operation. Control to start exposure of the image sensor 5 and to terminate the exposure of the image sensor 5 in response to the movement of the rear curtain of the focal-plane shutter 6 is referred to as electronic front curtain driving (second control). In the electronic front curtain driving, the electronic front curtain of the image sensor 5 is controlled by the shutter control unit 8. The mechanical front curtain driving and the electronic front curtain driving are switched by the controller 9. In this embodiment, the shutter method is switched based on a user's operation on an operation unit (not shown) among "a mechanical-front-curtain driving mode", "an electronic-front-curtain driving mode", and "an auto-select mode". The "mechanical-front-curtain driving mode" is a mode for mechanical front curtain driving, the "electronic-front-curtain driving mode" is a mode for electronic front curtain driving, and the "auto-select mode" is a mode for automatically switching between the mechanical front curtain driving and the electronic front curtain driving depending on the situation with the controller 9.

In this embodiment, the image-blur correcting unit 7, the shutter control unit 8, the controller 9, the image processor 10, and the storage 11 are separately shown for illustrative purposes, as in FIG. 1B. At least one processor, such as a central processing unit (CPU), corresponds to those components. For example, the functions of the image-blur correcting unit 7, the shutter control unit 8, the controller 9, the image processor 10, and the storage 11 may be executed by one CPU based on a program stored in a memory in the CPU to perform operations, or functional units, described in the following.

Figure 2A:
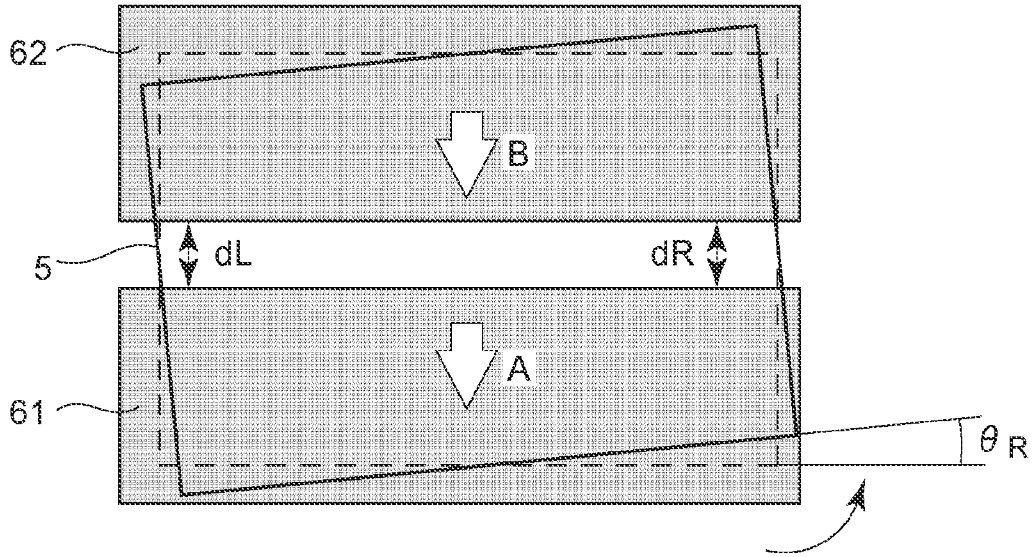
FIG. 2A is a schematic conceptual diagram illustrating a front curtain and a rear curtain moved in a mechanical-front-curtain driving mode in the image capturing apparatus.
Figure 2B:
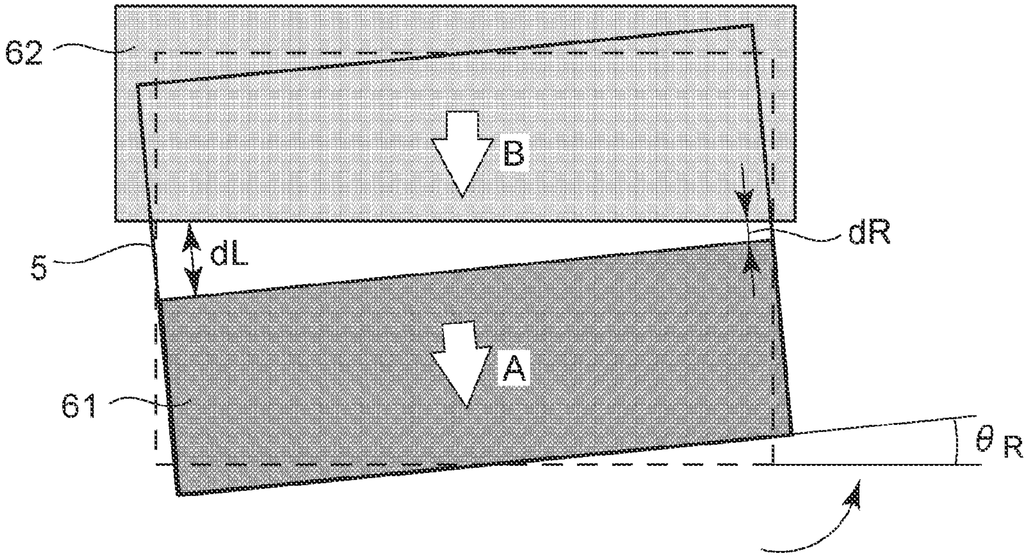
FIG. 2B is a schematic conceptual diagram illustrating the front curtain and the rear curtain moved in an electronic-front-curtain driving mode in the image capturing apparatus.

FIGS. 2A and 2B are schematic conceptual diagrams illustrating a state in which the front curtain and the rear curtain are moved in the mechanical front curtain driving and the electronic front curtain driving described above. FIG. 2A illustrates the mechanical front curtain driving, and FIG. 2B illustrates the electronic front curtain driving. As illustrated in FIG. 2A, when the image sensor 5 is tilted by rotating $\theta_R$ about the optical axis 4, the mechanical front curtain 61 moves in the direction of arrow A, and the mechanical rear curtain 62 moves in the direction of arrow B to form the gap dL=dR. In this state, because dL=dR, exposure unevenness due to the rotation of the image sensor 5 does not occur in the lateral direction of the image.

In contrast, in the case of the electronic front curtain driving, photoelectrical conversion is started in sequence in the column direction of the image sensor 5, and as a result, the mechanical front curtain 61 is virtually present in the solid area at the lower part of the image sensor 5, as illustrated in FIG. 2B. The column direction of the image sensor 5 is the direction of arrow A, which differs in orientation from arrow B, which is the moving direction of the mechanical rear curtain 62, by the tilt of the image sensor 5 rotating $\theta_R$ about the optical axis 4. As a result, the gaps dL and dR between the electronic front curtain and the mechanical rear curtain 62 on the left and the right of the image sensor 5 have the relation of dL>dR. Shooting in this state causes exposure unevenness in the lateral direction of the image due to the rotation of the image sensor 5. The exposure unevenness in the lateral direction of the image increases as $\theta_R$ increases. The larger the gaps dL and dR between the front curtain and the rear curtain, the smaller the influence of the exposure unevenness due to the difference between dL and dR, and the smaller the gaps dL and dR between the front curtain and the rear curtain, the larger the influence of the exposure unevenness due to the difference between dL and dR.

For this reason, if the exposure time during which the influence of exposure unevenness is large (at high shutter speed), the mechanical front curtain driving may be selected.

The roll-blur correcting operation tends to need a smaller rotation angle (correction angle) for correction than the horizontal correcting operation. For this reason, if only the roll-blur correcting operation is enabled in the image capturing apparatus 1000, the degree of the exposure unevenness may be smaller than when the horizontal correction is enabled.

FIGS. 3A to 3F are schematic diagrams for illustrating conditions for switching the front curtain driving. In FIGS. 3A to 3F, the shutter speed is shown on the horizontal axis, in which the further to the right, the faster the shutter speed, that is, the shorter the exposure time. In the following, the right side of FIGS. 3A to 3F is referred to as the high-speed side (the short exposure time side), and the left side as the low-speed side (the long exposure time side).

In the shutter speed region of Zone 1, the electronic front curtain driving may be selected because image blur due to the vibrations associated with the movement of the mechanical front curtain is prone to occur.

In contrast, in the shutter speed region of Zone 2 in which the shutter speed is higher (the exposure time is shorter) than that of Zone 1, the mechanical front curtain driving may be selected because exposure unevenness caused by the rotation of the image sensor 5 is prone to occur.

Since the frequency of vibrations associated with the movement of the mechanical front curtain is often in the order of 100 Hz, a sufficiently shorter exposure time than the period of vibration is unlikely to cause image blur, but a longer exposure time than the period of vibration is likely to cause image blur. Since the vibrations cease after a predetermined elapse of time, a sufficiently longer exposure time than the predetermined period of time, duration of exposure without vibration increases, which reduces the influence on the image associated with the movement of the mechanical front curtain.

The ranges of Zone 1 and Zone 2 will be described herein below.

The fastest possible shutter speed (the shortest exposure time) is set for the boundary value (the upper limit) of the fast side of Zone 2. In contrast, a shutter speed at which the image blur associated with the movement of the mechanical front curtain can be confined within predetermined image quality degradation is set for the boundary value (the upper limit) of the fast side of Zone 1.

For the boundary value (the lower limit) of the low speed side of Zone 2, a shutter speed at which the exposure unevenness of the image associated with the rotation of the image sensor 5 can be confined within predetermined exposure unevenness is set. In contrast, for the boundary value (the lower limit) of the low speed side of Zone 1, the possible lowest shutter speed (the longest exposure time) is set. The ranges of Zone 1 and Zone 2 are not overlapped, and the boundary value of the low speed side of Zone 2 is set to a higher shutter speed than that of the boundary value of the fast side of Zone 1.

Thus, the front curtain driving operations suited for Zone 1 and Zone 2 are clearly differentiated. However, which of the mechanical front curtain driving and the electronic front curtain driving is suitable for a shutter speed between Zone 1 and Zone 2 depends on the situation. Accordingly, in this embodiment, when "auto-select mode" is set, the shutter speed (the switching threshold) at which the mechanical front curtain driving and the electronic front curtain driving are switched is changed depending on the situation.

FIGS. 3B to 3F show shutter speeds at which the mechanical front curtain driving and the electronic front curtain driving are switched in the "auto-select mode". The shutter speeds at which the mechanical front curtain driving and the electronic front curtain driving are switched in FIGS. 3B to 3F will be described with reference to FIG. 4.

Figure 4:
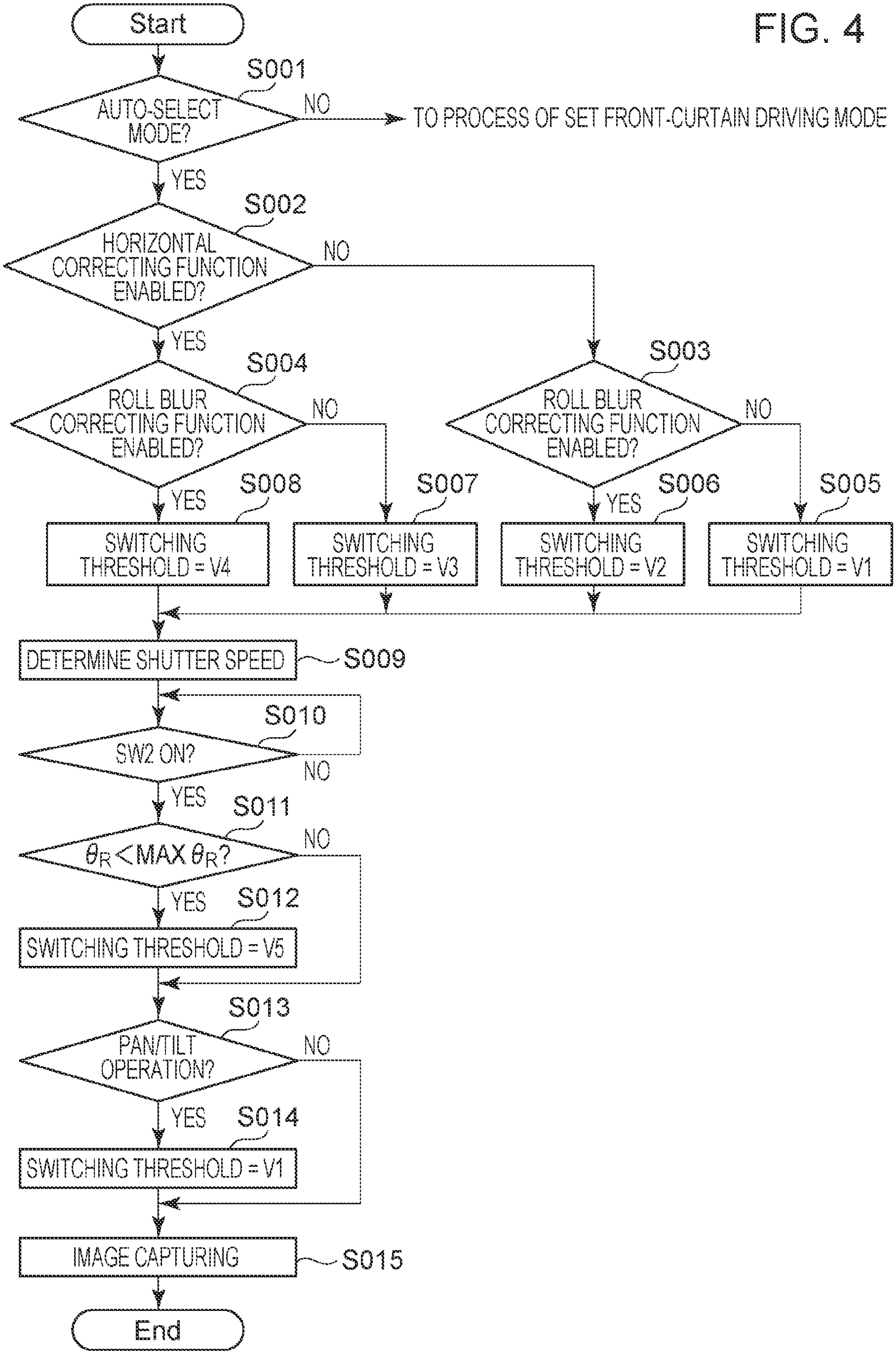
FIG. 4 is a flowchart for shutter control processing in the image capturing apparatus according to an embodiment.

FIG. 4 is a flowchart for shutter control processing in the image capturing apparatus 1000.

The processing of this flowchart is started from the time when the power of the image capturing apparatus 1000 is turned on, and a shooting preparing operation is completed so that the image capturing apparatus 1000 is ready to shoot. In this flowchart, the processing ends after one image capturing is completed. Alternatively, in continuous shooting, all of the processes of this flowchart may be executed for each shooting, or some of the processes of this flowchart may be performed for each shooting. In this embodiment, live view shooting (not described in this flowchart) is started after the image capturing apparatus 1000 is ready to shoot, and an operation corresponding to enabled one of the horizontal correcting function and the roll blur correcting function is started.

In step S001, the controller 9 determines whether the image capturing apparatus 1000 is set in the "auto-select mode". If the setting is not the "auto-select mode", the "mechanical-front-curtain driving mode" or the "electronic-front-curtain driving mode" is set, and the process goes to the process of the set front curtain driving mode. Since the processes of the "mechanical-front-curtain driving mode" and the "electronic-front-curtain driving mode" are well known, detailed descriptions will be omitted. If the setting is the "auto-select mode", the process goes to step S002.

In step S002, the controller 9 determines whether the horizontal correcting function for horizontally orienting the lateral direction of the picture composition is enabled. Enabling/disabling of the horizontal correcting function is switched based on a user's operation on the operation unit (not shown). If the horizontal correcting function is disabled, the process goes to step S003, and if enabled, the process goes to step S004.

In step S003, the controller 9 determines whether the roll blur correcting function is enabled. The enabling/disabling of the roll blur correcting function is switched based on a user's operation on the operation unit (not shown). If the roll blur correcting function is disabled, the process goes to step S005, and if enabled, the process goes to step S006. The enabling/disabling of the roll blur correcting function may be replaced with the enabling/disabling of the blur correcting function for moving the image sensor. In other words, it may be determined whether to correct blur not only in the roll direction but also in a yaw direction and a pitch direction.

In step S004, the controller 9 determines whether the roll blur correcting function is enabled as in step S003. If the roll blur correcting function is disabled, the process goes to step S007, and if enabled, the process goes to step S008.

In step S005 to S008, the controller 9 sets the switching threshold, which is a shutter speed at which the mechanical front curtain driving and the electronic front curtain driving are switched, to V1 to V4, respectively. For image capturing at a low shutter speed less than or equal to the set switching threshold, the controller 9 performs the electronic front curtain driving, and for image capturing at a shutter speed higher than the set switching threshold, the controller 9 performs the mechanical front curtain driving.

Figure 3A:
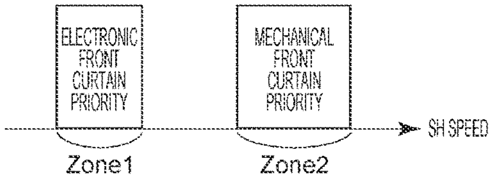
FIGS. 3A to 3F are schematic diagrams for illustrating conditions for switching the front curtain driving modes in the image capturing apparatus.
Figure 3B:
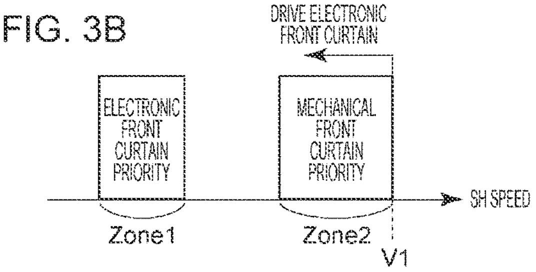

In step S005, the highest shutter speed V1 is set as the switching threshold because both the horizontal correcting function and the roll blur correcting function are disabled. Since V1 is the fastest possible shutter speed (the shortest exposure time) of the image capturing apparatus 1000, the electronic front curtain driving is performed even at any shutter speed. The state in which the switching threshold is set at V1 is illustrated in FIG. 3B.

Figure 3C:
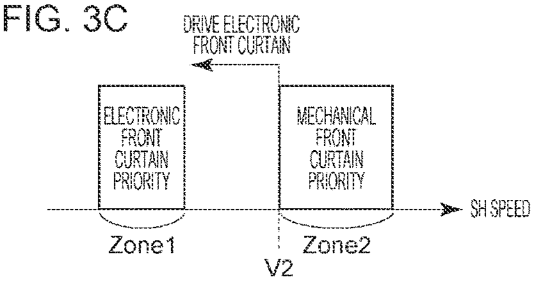

In step S006, V2 lower than V1 is set as the switching threshold because the horizontal correcting function is disabled and only the roll blur correcting function is enabled, so that rotation of the image sensor 5 for the roll blur correcting function is assumed. The value V2 is equal to the boundary value of the low speed side (the lower limit) of Zone 2. Thus, for a shutter speed hither than V2 at which the exposure unevenness exceeds an acceptable level when the image sensor 5 is rotated to the maximum rotation angle with the roll blur correcting function, the mechanical front curtain driving is performed, and for a shutter speed lower than or equal to V2, the electronic front curtain driving is performed. The state in which the switching threshold is set at V2 is illustrated in FIG. 3C.

Figure 3D:
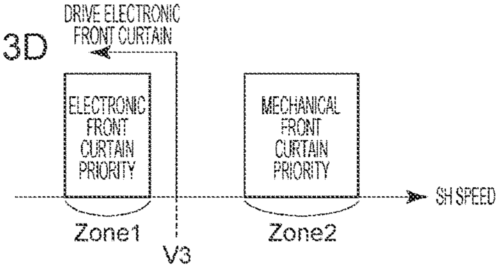

In step S007, V3 lower than V2 is set as the switching threshold because the horizontal correcting function is enabled and the roll blur correcting function is disabled, so that the rotation angle of the image sensor 5 may be larger than that with the roll blur correcting function. Thus, for a shutter speed higher than V3 at which the exposure unevenness exceeds the acceptable level when the image sensor 5 is rotated to the maximum rotation angle with the horizontal correcting function, the mechanical front curtain driving is performed, and for a shutter speed lower than or equal to V3, the electronic front curtain driving is performed. The state in which the switching threshold is set at V3 is illustrated in FIG. 3D.

Figure 3E:
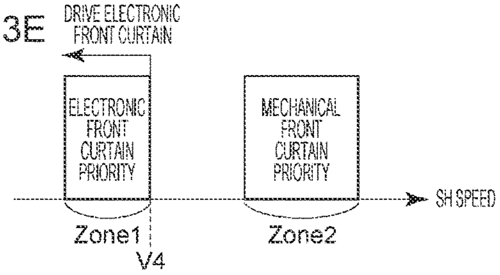

In step S008, V4 lower than V3 is set as the switching threshold because both the horizontal correcting function and the roll blur correcting function are enabled, so that the rotation angle of the image sensor 5 may be larger than when only one of the functions is executed. The value V4 is equal to the boundary value on the high speed side (the upper limit) of Zone 1. The state in which the switching threshold is set at V4 is illustrated in FIG. 3E. As clearly shown in FIGS. 3A to 3F, for shutter speeds lower than or equal to V4, the electronic front curtain driving is selected regardless of the situation, and for shutter speeds higher than V4, one of the mechanical front curtain driving and the electronic front curtain driving is selected depending on the situation.

After the switching threshold, which is a shutter speed at which the mechanical front curtain driving and the electronic front curtain driving are switched, in steps S005 to S008, the process goes to step S009.

In step S009, the controller 9 determines the shutter speed (exposure time) for image capturing (main exposure). Any method may be adopted to determine the shutter speed. The shutter speed may be determined based on a user's operation on the operation unit (not shown) or based on a photometric value calculated by evaluating an image obtained by live view shooting with the image sensor 5.

In step S010, the controller 9 determines whether a release button (not shown) is fully pressed (SW2 is turned on), which is an instruction to capture a still image (instruction for main exposure). Step S010 is repeated until the SW2 is determined to be turned on. If the SW2 is determined to be turned on, the process goes to step S011. If the SW2 is determined not to be turned on, the process may be returned to step S002 or step S009 in consideration of a case where various settings are changed by the user or the shooting environment has changed before the SW2 is turned on.

In step S011, the controller 9 determines whether the current rotation angle $\theta_R$ of the image sensor 5 for the horizontal correcting function, controlled by the image-blur correcting unit 7, is less than the maximum rotation angle $MAX\theta_R$ with the horizontal correcting function. If the camera orientation before the SW2 is turned on is rotated about the optical axis to significantly tilt with respect to the horizontal direction, the rotation angle of the image sensor 5 for the horizontal correcting operation is large, but if the tilt is small, the rotation angle of the image sensor 5 for the horizontal correcting operation is small. In steps S007 and S008, the switching threshold is set on the assumption that the image sensor 5 is rotated to the maximum rotation angle with the horizontal correcting function when the horizontal correcting function is enabled. However, the image sensor 5 is not further rotated for the horizontal correcting function after image capturing (main exposure) is started. For this reason, setting the switching threshold based on the rotation angle $\theta_R$ of the image sensor 5 for the horizontal correcting function for the image sensor 5 at that point in time allows for front curtain driving more suited to the situation. If $\theta_R$ is less than $MAX\theta_R$, the process goes to step S012, and if $\theta_R$ is not less than $MAX\theta_R$, the process goes to step S013.

Figure 3F:
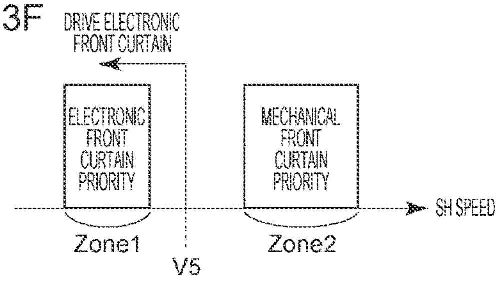

In step S012, the controller 9 sets the switching threshold, which is a shutter speed at which the mechanical front curtain driving and the electronic front curtain driving are switched, to V5. The switching threshold V5 is a shutter speed between V1 and V4, as illustrated in FIG. 3F. Although FIG. 3F illustrates one pattern, this is illustrative only. the controller 9 changes V5 depending on the magnitude of the rotation angle $\theta_R$. If the roll blur correcting function is enabled, a value closer to V2 is set to V5 as the rotation angle $\theta_R$ decreases, and a value closer to V4 is set to V5 as the rotation angle $\theta_R$ increases. If the roll blur correcting function is disabled, a value closer to V1 is set to V5 as the rotation angle $\theta_R$ decreases, and a value closer to V3 is set to V5 as the rotation angle $\theta_R$ increases. Thus, switching between the mechanical front curtain driving and the electronic front curtain driving at the shutter speed set depending on the rotation angle of the image sensor 5 immediately before image capturing allows for front curtain control that is more suited to the situation. In step S011, the current rotation angle $\theta_R$ of the image sensor 5 and the maximum rotation angle MAX$\theta_R$ with the horizontal correcting function are compared. Alternatively, the switching threshold V5 may be set according to the current rotation angle $\theta_R$ of the image sensor 5 without comparing the rotation angles. In this case, the switching threshold V5 set when the rotation angle $\theta_R$ and the maximum angle MAX$\theta_R$ are equal becomes equal to V3 or V4 depending on whether the roll blur correcting function is enabled.

In step S013, the controller 9 determines whether a pan/tilt operation is performed by the user from the output of the gyroscope of the image-blur correcting unit 7. The pan/tilt operation determined here is a continuous panning operation or tilting operation, that is, a following shot operation. A known method may be used to determine whether the following shot operation is performed, and a detailed description will be omitted. If the result of determination shows that the pan/tilt operation is being performed, the process goes to step S014, and shows that no pan/tilt operation is being performed, the process goes to step S015.

In step S014, the controller 9 sets V1 as the switching threshold, which is a shutter speed at which the mechanical front curtain driving and the electronic front curtain driving are switched. This is for the purpose of achieving the electronic front curtain driving even at any shutter speed. This is because the following shot operation forms an image with a blurred background and the main subject to be standing still is often located at the center of the image, so that exposure unevenness in the lateral direction of the image is inconspicuous.

In step S015, the controller 9 selects one of the mechanical front curtain driving and the electronic front curtain driving based on the switching threshold and the shutter speed set in the above flowchart and controls the components to execute the selected front curtain driving to perform image capturing (main exposure).

Thus, this embodiment changes the shutter speed (switching threshold) at which the mechanical front curtain driving and the electronic front curtain driving are switched based on the settings of the image capturing apparatus 1000 and the situation, such as the motion, of the image capturing apparatus 1000.

Switching between the mechanical front curtain driving and the electronic front curtain driving allows for reducing both image blur due to the mechanical movement of the shutter and exposure unevenness due to the rotation of the image sensor 5.

The selection of the mechanical front curtain driving or the electronic front curtain driving may be made based on the information on whether the horizontal correcting function is enabled, the information on whether the roll blur correcting function is enabled, and the information about the rotation of the image sensor 5, such as the rotation angle of the image sensor 5, without using the switching threshold. For example, the information about the rotation of the image sensor 5 and the information on a combination of the shutter speed and the front curtain driving may be stored in the memory of the controller 9 in advance, and one of the mechanical front curtain driving and the electronic front curtain driving may be selected according to the stored combination information.

The flowchart described in this embodiment is provided merely for illustrative purposes and may be changed as appropriate within a scope of possible implementation of the disclosure, for example, the order of processes. The advantageous effects of the disclosure are given even with a flowchart in which part of the flowchart described in this embodiment is omitted. For example, in S002 to S008, the switching threshold is set depending on the combination of the enabling/disabling of the horizontal correcting function and the roll blur correcting function. Alternatively, setting the switching threshold based on the enabling/disabling of only one of the horizontal correcting function and the roll blur correcting function gives the advantageous effects of the disclosure. Omitting, for example, steps S011 and S012 or steps S013 and S014 gives the advantageous effects of the disclosure as well. A larger number of switching thresholds than that in the flowchart of this embodiment may be set, and other situations may be taken into consideration to set the switching threshold. At least one of an operation corresponding to the horizontal correcting function and an operation corresponding to the roll blur correcting function does not need to be executed during execution of the live view function.

According to an embodiment of the disclosure, an image capturing apparatus that rotatably holds an image sensor can reduce both image blur due to the movement of the light shielding member and exposure unevenness due to the rotation of the image sensor.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-065733, filed Apr. 13, 2023, which is hereby incorporated by reference herein in its entirety.

What is claimed is:

1. An image capturing apparatus comprising:

an image sensor held so as to be rotatable in a plane intersecting an optical axis, the image sensor being configured to accumulate electric charges at a different timing for each area;

a light shielding unit including a first light shielding member and a second light shielding member that block a light beam toward the image sensor;

a determination unit configured to determine an exposure time of the image sensor; and a control unit configured to select and execute one of first control to start exposure of the image sensor in response to movement of the first light shielding member and terminate the exposure of the image sensor in response to movement of the second light shielding member, and second control to start exposure of the image sensor and terminate the exposure of the image sensor in response to movement of the second light shielding member, wherein the control unit selects one of the first control and the second control based on a threshold according to information about the rotation of the image sensor and the determined exposure time, wherein, when the determined exposure time is less than or equal to the threshold, the control unit selects the second control, and when the determined exposure time is not less than or equal to the threshold, the control unit selects the first control, wherein the control unit sets the threshold based on one of whether a horizontal correcting function for rotating the image sensor to orient a lateral direction of a picture composition horizontally is enabled and whether a blur correcting function for rotating the image sensor is enabled, wherein, when the horizontal correcting function is not enabled and the blur correcting function is not enabled, the control unit sets the threshold to a first threshold, wherein, when the horizontal correcting function is not enabled and the blur correcting function is enabled, the control unit sets the threshold to a second threshold, wherein, when the horizontal correcting function is enabled and the blur correcting function is not enabled, the control unit sets the threshold to a third threshold, wherein, when the horizontal correcting function is enabled and the blur correcting function is enabled, the control unit sets the threshold to a fourth threshold, and wherein the first threshold is an exposure time shorter than the second threshold, the second threshold is an exposure time shorter than the third threshold, and the third threshold is an exposure time shorter than the fourth threshold.

2. A method for controlling an image capturing apparatus including an image sensor held so as to be rotatable in a plane intersecting an optical axis, the image sensor being configured to accumulate electric charges at a different timing for each area and a light shielding unit including a first light shielding member and a second light shielding member that block a light beam toward the image sensor, the method comprising:

determining an exposure time of the image sensor; and selecting and executing one of first control to start exposure of the image sensor in response to movement of the first light shielding member and terminate the exposure of the image sensor in response to movement of the second light shielding member and second control to start exposure of the image sensor and terminate the exposure of the image sensor in response to movement of the second light shielding member, wherein, in the control, one of the first control and the second control is selected based on a threshold according to information about the rotation of the image sensor and the determined exposure time, wherein, when the determined exposure time is less than or equal to the threshold, the second control is selected, and when the determined exposure time is not less than or equal to the threshold, the first control is selected, wherein the control unit sets the threshold based on one of whether a horizontal correcting function for rotating the image sensor to orient a lateral direction of a picture composition horizontally is enabled and whether a blur correcting function for rotating the image sensor is enabled, wherein, when the horizontal correcting function is not enabled and the blur correcting function is not enabled, the threshold is set to a first threshold, wherein, when the horizontal correcting function is not enabled and the blur correcting function is enabled, the threshold is set to a second threshold, wherein, when the horizontal correcting function is enabled and the blur correcting function is not enabled, the threshold is set to a third threshold, wherein, when the horizontal correcting function is enabled and the blur correcting function is enabled, the threshold is set to a fourth threshold, and wherein the first threshold is an exposure time shorter than the second threshold, the second threshold is an exposure time shorter than the third threshold, and the third threshold is an exposure time shorter than the fourth threshold.

* * * * *